(12) United States Patent
Lee et al.

(10) Patent No.: US 10,574,383 B1
(45) Date of Patent: Feb. 25, 2020

(54) APPARATUS AND METHOD FOR GENERATING JAMMING SIGNAL

(71) Applicant: AGENCY FOR DEFENSE DEVELOPMENT, Daejeon (KR)

(72) Inventors: Jung Hoon Lee, Daejeon (KR); Je Il Jo, Daejeon (KR); Young Ju Park, Daejeon (KR); Byeong Nam Lee, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 86 days.

(21) Appl. No.: 15/850,626

(22) Filed: Dec. 21, 2017

(30) Foreign Application Priority Data

Oct. 20, 2017 (KR) ........................ 10-2017-0136943

(51) Int. Cl.
| | | |
|---|---|---|
| *H04K 3/00* | (2006.01) | |
| *G01S 7/36* | (2006.01) | |
| *G01S 7/38* | (2006.01) | |
| *G01S 7/02* | (2006.01) | |
| *G01S 7/28* | (2006.01) | |

(52) U.S. Cl.
CPC ............... *H04K 3/224* (2013.01); *H04K 3/45* (2013.01); *H04K 3/46* (2013.01); *G01S 7/021* (2013.01); *G01S 7/2813* (2013.01); *G01S 7/36* (2013.01); *G01S 7/38* (2013.01)

(58) Field of Classification Search
CPC . H04K 3/224; H04K 3/45; H04K 3/46; G01S 7/38; G01S 7/36; G01S 7/2813; G01S 7/021
See application file for complete search history.

(56) References Cited

U.S. PATENT DOCUMENTS 8,830,112 B1 * 9/2014 Buehler .................... G01S 7/38
342/13

* cited by examiner

*Primary Examiner* — Eugene Yun
(74) *Attorney, Agent, or Firm* — Fenwick & West LLP

(57) ABSTRACT

An apparatus for generating a jamming signal comprises a signal receiving unit configured to receive an external pulse signal, an amplitude signal generating unit configured to generate an amplified signal by amplifying the pulse signal, a noise signal generating unit configured to generate a noise signal having a bandwidth including a bandwidth of the pulse signal, a control unit configured to control the amplified signal generating unit and the noise signal generating unit such that a signal-to-noise ratio of the amplified signal and the noise signal to be received by an apparatus that has transmitted the pulse signal becomes constant based on characteristics of the pulse signal and a signal radiating unit configured to radiate the amplified signal and the noise signal.

16 Claims, 3 Drawing Sheets

APPARATUS AND METHOD FOR GENERATING JAMMING SIGNAL

CROSS-REFERENCE TO RELATED APPLICATIONS

This application claims priority to and benefit of Korean Patent Application No. 10-2017-0136943, filed on Oct. 20, 2017, the disclosure of which is incorporated herein in its entirety by reference.

FIELD OF THE INVENTION

The present disclosure relates to an apparatus and a method for generating a jamming signal; and, more particularly, to an apparatus and a method for generating a jamming signal for disrupting a radar for tracking a position of a target.

BACKGROUND OF THE INVENTION

A radar for tracking a position of a target radiates a pulse signal and tracks the target based on a strength of an echo signal that is a reflected signal of the pulse signal from the target. In response thereto, the target, i.e., an aircraft or a naval ship, may disrupt a radar of an enemy by using a jamming signal generating apparatus for radiating a jamming signal for disrupting the measurement of the echo signal.

The jamming signal generating apparatus radiates a jamming signal with a transmittable maximum effective output. In that case, the strength of the echo signal is smaller than that of the jamming signal. Therefore, the radar of the enemy recognizes the echo signal as a noise and measures only the jamming signal. Accordingly, the jamming signal generating apparatus can disrupt the radar of the enemy by impeding the measurement of the echo signal.

When the strength of the jamming signal is greater than the strength of the echo signal, however, the radar may switch to a HOJ (Home On Jam) mode or a TOJ (Track On Jam) mode. As a consequence, the radar may track the target radiating the jamming signal and the original purpose of the jamming signal generating apparatus may not be achieved.

SUMMARY OF THE INVENTION

In view of the above, the embodiment of the present disclosure provides a technique for disrupting a radar tracking an echo signal that is a reflected signal of a pulse signal which is radiated from the radar toward a target.

Further, the embodiment of the present disclosure provides a technique for preventing a radar that receives a jamming signal from switching to a HOJ (Home On Jam) mode or a TOJ (Track On Jam) mode.

However, the technical objectives of the embodiments of the present disclosure are not limited to the above-mentioned objectives, and various objectives will be apparently understood by those skilled in the art from the following description.

An apparatus for generating a jamming signal may comprise a signal receiving unit configured to receive an external pulse signal, an amplitude signal generating unit configured to generate an amplified signal by amplifying the pulse signal, a noise signal generating unit configured to generate a noise signal having a bandwidth including a bandwidth of the pulse signal, a control unit configured to control the amplified signal generating unit and the noise signal generating unit such that a signal-to-noise ratio of the amplified signal and the noise signal to be received by an apparatus that has transmitted the pulse signal becomes constant based on characteristics of the pulse signal and a signal radiating unit configured to radiate the amplified signal and the noise signal.

Further, the control unit may control the amplified signal generating unit such that a strength of the amplified signal is constant.

Further, the control unit may control the noise signal generating unit such that a strength of the noise signal is constant.

Further, the control unit may control the noise signal generating unit such that the strength of the noise signal becomes greater than a strength of the received pulse signal.

Further, the control unit may control the amplified signal generating unit and the noise signal generating unit such that a strength of the amplified signal and a strength of the noise signal become greater than a strength of the received pulse signal, and the strength of the amplified signal becomes greater than the strength of the noise signal.

Further, the control unit may control the signal radiating unit such that the amplified signal is radiated earlier than the noise signal.

A method for generating a jamming signal may comprise receiving an external pulse signal, generating an amplified signal by amplifying the pulse signal, generating a noise signal having a bandwidth including a bandwidth of the pulse signal and radiating the amplified signal and the noise signal, wherein the amplified signal and the noise signal are generated such that a signal-to-noise ratio of the amplified signal and the noise signal to be received by an apparatus that has transmitted the pulse signal become constant based on characteristics of the pulse signal.

Further, said generating the amplified signal may include controlling a strength of the amplified signal to be constant.

Further, said generating the noise signal may include controlling a strength of the noise signal to be constant.

Further, said generating the noise signal may include controlling the strength of the noise signal to be greater than a strength of the received pulse signal.

The method may further comprise controlling the strength of the amplified signal and the strength of the noise signal to be greater than the strength of the received pulse signal and controlling the strength of the amplified signal to be greater than the strength of the noise signal.

Further the amplified signal may be radiated earlier than the noise signal.

EFFECT OF THE INVENTION

In the embodiment of the present disclosure, it is possible to prevent the radar for tracking the target from switching to HOJ (Home On Jam) mode or TOJ (Track On Jam) mode by generating the jamming signal in which the noise signal and the amplified signal obtained by amplifying the pulse signal, are mixed.

Further, in the embodiment of the present disclosure, it is possible to make the radar measure a constant signal-to-noise ratio and thus prevent the radar from tracking the position of the target.

BRIEF DESCRIPTION OF THE DRAWINGS

The objectives and features of the disclosure will become apparent from the following description of the embodiments, given in conjunction with the accompanying drawings, in which.

DETAILED DESCRIPTION OF THE EMBODIMENTS

Figure 1:
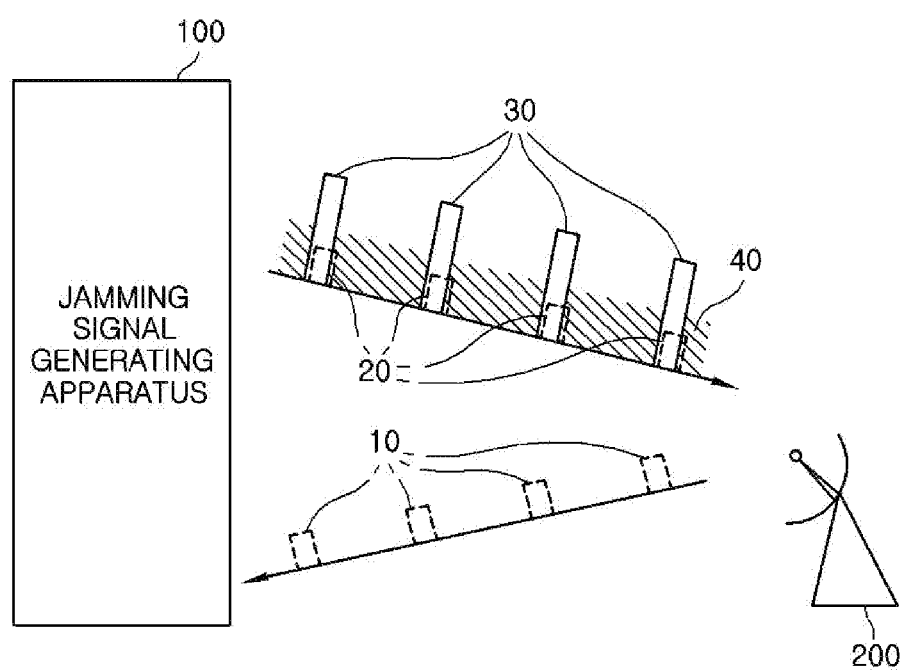
FIG. 1 shows an overall system including a radar and a jamming signal generating apparatus in accordance with an embodiment of the present disclosure.

The advantages and features of the present disclosure and methods of accomplishing such will be clearly understood from the following description taken in conjunction with the accompanying drawings. However, the present disclosure is not limited to those embodiments described, as embodiments may be implemented in various forms. It should be noted that the present embodiments are provided to make a full disclosure and also to allow those skilled in the art to know the full range of the present disclosure. Therefore, the scope of the present invention should be defined only by the appended claims.

In describing the embodiments of the present disclosure, if it is determined that the detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition made should be based in consideration of the contents of the entire specification.

Functional blocks illustrated in the drawings and described below are merely examples of possible implementations. In other implementations, different functional blocks may be used without departing from the scope of the detailed description. Although one or more functional blocks of the present disclosure are illustrated as separate blocks, one or more of the functional blocks of the present disclosure may be a combination of various hardware and software elements executing the same function.

Further, it should be understood that an expression that some elements are "included" is an expression of an "open type" and the expression simply denotes that the corresponding elements are present, but does not exclude additional elements.

Furthermore, when one element is described as being "connected" or "coupled" to the other element, it should be understood that one element may be directly connected or coupled to the other element, but a third element may be interposed between the two elements.

Hereinafter, embodiments of the present disclosure will be described with reference to the accompanying drawings.

FIG. 1 shows an overall system 1 including a jamming signal generating apparatus 100 in accordance with an embodiment of the present disclosure and a radar 200.

The radar 200 radiates a pulse signal 10 to track a position of a target and tracks the position of the target by measuring an echo signal 20, which is the pulse signal 10 reflected back from the target to the radar.

The jamming signal generating apparatus 100 radiates a jamming signal for disrupting the radar 200. The jamming signal generating apparatus 100 may be mounted at, e.g., a fighter aircraft, a naval ship or the like that should not be tracked by the enemy.

When the strength of the jamming signal is greater than that of the echo signal 20, the radar 200 may recognize the echo signal 20 as a noise. In that case, however, the radar 200 may be switched to a HOJ (Home On Jam) mode or a TOJ (Track On Jam) mode and can track the target that radiates the jamming signal based on the jamming signal. Therefore, the original purpose of the jamming signal may not be achieved.

Accordingly, the jamming signal generating apparatus 100 in accordance with the embodiment of the present disclosure prevents the radar 200 from switching to HOJ mode or TOJ mode by generating a jamming signal in which an amplified signal 30, obtained by amplifying the pulse signal 10, and a noise signal 40 are mixed. Further, the jamming signal generating apparatus 100 prevents the radar 200 from tracking the position of the target by making the radar 200 measure a constant signal-to-noise ratio. When the radar 200 measures a signal received from the outside, a signal-to-noise ratio is measured based on a signal having the highest strength. Therefore, the signal-to-noise ratio measured by the radar 200 denotes a signal-to-noise ratio at the time of measuring the amplified signal 30. Hereinafter, the configuration of the jamming signal generating apparatus 100 in accordance with an embodiment of the present disclosure will be described with reference to FIG. 2.

Figure 2:
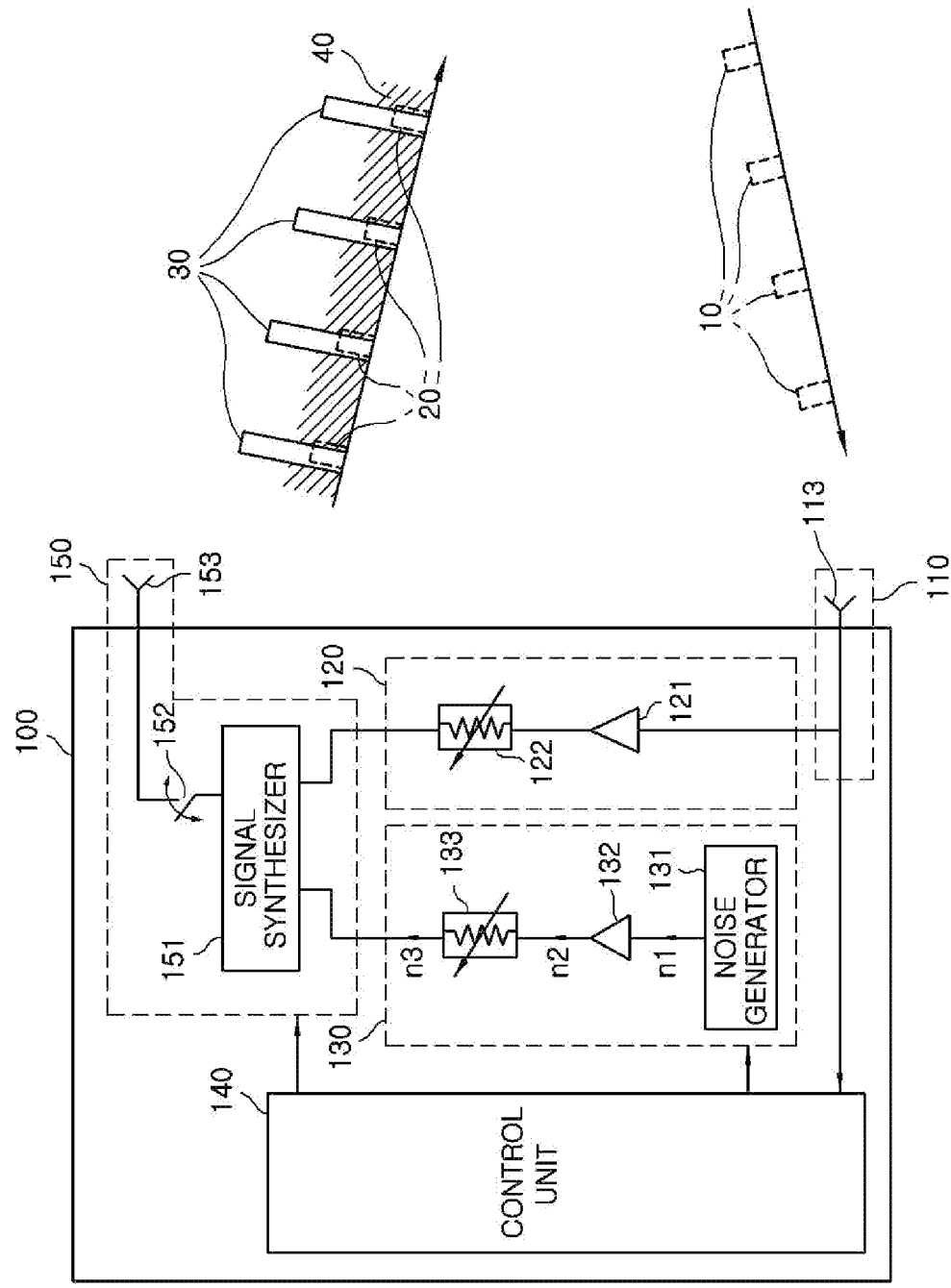
FIG. 2 is a functional block diagram of the jamming signal generating apparatus in accordance with an embodiment of the present disclosure.

FIG. 2 is a functional block diagram of the jamming signal generating apparatus 100 in accordance with the embodiment of the present disclosure.

Referring to FIG. 2, the jamming signal generating apparatus 100 in accordance with the embodiment of the present disclosure includes a signal receiving unit 110, an amplified signal generating unit 120, a noise signal generating unit 130, a control unit 140 and a signal radiating unit 150.

The signal receiving unit 110 receives a pulse signal 10 from the outside. To do so, the signal receiving unit 110 may include a receiving antenna 113. The pulse signal 10 may be, e.g., a signal that is radiated from the radar 200 to track a target.

The amplified signal generating unit 120 generates an amplified signal 30 by amplifying the pulse signal 10 received by the signal receiving unit 110. To do so, the amplified signal generating unit 120 may include an amplifier 121 and an attenuator 122. The amplifier 121 can amplify the received pulse signal 10 based on an amplification factor controlled by the control unit 140 to be described later. The attenuator 122 can be connected to an output terminal of the amplifier 121 to more accurately control the amplification factor of the pulse signal 10.

The strength of the amplified signal 30 generated can be expressed by the following Eq. (1).

$$P_{pulse\_ERP} = G_j P_{pulse\_out} \qquad \text{Eq. (1)}$$
$$= G_j G_{repeat\_pulse} P_{pulse\_in}$$

Here, $G_{pulse\_ERP}$ indicates a strength of the amplified signal 30 outputted from a transmission antenna 153; $G_j$ indicates an amplification factor of the transmission antenna 153; $G_{repeat\_pulse}$ indicates an amplification factor of the amplified signal generating unit 120; $P_{pulse\_in}$ indicates a strength of the pulse signal 10 inputted to the amplified signal generating unit 120; and $P_{pulse\_out}$ indicates a strength of the amplified signal 30 outputted from the amplified signal generating unit 120.

The noise signal generating unit 130 can generate a noise signal 40 having a bandwidth equal to that of the pulse signal 10 or having a bandwidth that includes the bandwidth of the pulse signal 10. The noise signal generating unit 130 can control the characteristics of the noise signal 40 under the control of the control unit 140 to be described later. To do so, the noise signal generating unit 130 may include a noise generator 131, an amplifier 132 and an attenuator 133.

The noise generator 131 can generate a noise signal n1 having a bandwidth including a bandwidth of the pulse signal 10 based on the pulse width, the central frequency and the bandwidth of the pulse signal 10 which are analyzed by the control unit 140. The amplifier 132 can control a strength of a noise signal n2 to be outputted by amplifying the noise signal n1 generated by the noise generator 131 based on the amplification factor controlled by the control unit 140. At this time, the attenuator 133 may be connected to the output terminal of the amplifier 132 to more accurately control the amplification factor of the noise signal n2 and output a noise signal n3.

The strength of the noise signal n1 generated by the noise generator 131 can be expressed by Eq. (2) and the strength of the noise signal 40 to be finally outputted through the transmission antenna 153 can be expressed by Eq. (3).

$$P_N = N_o B_j \quad \text{Eq. (2)}$$

In Eq. (2), $P_N$ indicates a strength of the noise signal n1 outputted from the noise generator 131; $N_o$ indicates a magnitude of the central frequency of the noise signal n1; and $B_j$ indicates a bandwidth of the noise signal n1.

$$J_{GN} = G_j J_N \quad \text{Eq. (3)}$$
$$= G_j G_N P_N$$

In Eq. (3), $J_{GN}$ indicates a strength of the noise signal 40 outputted from the transmission antenna 153; $G_N$ indicates an amplification factor of the noise signal generating unit 130; and $P_N$ indicates a strength of the noise signal n1 generated by the noise generator 131.

The control unit 140 controls the amplified signal generating unit 120 and the noise signal generating unit 130 such that the signal-to-noise ratio of the amplified signal 30 and the noise signal 40 to be measured by the radar 200 that has transmitted the pulse signal 10 becomes constant based on the characteristics of the pulse signal 10. When the radar 200 measures a signal received from the outside, a signal-to-noise ratio is measured based on a signal having the highest strength. Therefore, the signal-to-noise ratio denotes a signal-to-noise ratio of the amplified signal 30 and the noise signal 40 at the time of measuring the amplified signal 30 by the radar 200.

In other words, when the amplified signal 30 and the noise signal 40 radiated by the jamming signal generating apparatus 100 are received by the radar 200 that has radiated the pulse signal 10, the control unit 140 prevents the radar 200 from tracking the position of the target by making the radar 200 measure a constant signal-to-noise ratio. Accordingly, the radar 200 does not switch to HOJ (Home On Jam) mode or TOJ (Track On Jam) mode.

Hereinafter, the signal-to-noise ratio measured by the radar 200 at the time of receiving the amplified signal 30 and the noise signal 40 radiated from the jamming signal generating apparatus 100 will be described.

The strength of the amplified signal 30 to be received by the radar 200 is expressed by Eq. (4) and the strength of the noise signal 40 to be received by the radar 200 is expressed by Eq. (5).

$$S_r = \frac{P_{pulse\_out} G_j}{4\pi R^2} A_e \quad \text{Eq. (4)}$$

Here, $S_r$ indicates a strength of the amplified signal 30 received by the radar 200; $P_{pulse\_out}$ indicates a strength of the amplified signal 30 outputted from the amplified signal generating unit 120; $G_j$ indicates an amplification factor of the transmission antenna 153; R indicates a distance between the jamming signal generating apparatus 100 and the radar 200; and $A_e$ indicates an effective cross sectional area. $A_e$ is expressed by $$A_e = \frac{\lambda^2}{4\pi} G_r.$$

Here, $\lambda$ indicates a wavelength and $G_r$ indicates a gain of a receiver of the radar 200.

$$J_r = \frac{J_N G_j}{4\pi R^2} A_e \frac{B_r}{B_j} \quad \text{Eq. (5)}$$

In Eq. (5), $J_r$ indicates a strength of the noise signal 40 received by the radar 200; $J_N$ indicates a strength of the noise signal 40 outputted from the noise signal generating unit 130; $G_j$ indicates an amplification factor of the transmission antenna 153; R indicates a distance between the jamming signal generating apparatus 100 and the radar 200; and $A_e$ indicates an effective cross sectional area of the receiver of the radar 200. $A_e$ is expressed by $$A_e = \frac{\lambda^2}{4\pi} G_r.$$

Here, $\lambda$ indicates a wavelength and $G_r$ indicates a gain of the receiver of the radar 200. $B_r$ indicates a filter bandwidth of the radar 200 and $B_j$ indicates a bandwidth of the noise signal 40 transmitted by the transmission antenna 153. $B_r$ and the pulse width (pw: Pulse Width) of the radar satisfy a condition of $B_r = 1/pw$.

Therefore, according to Eqs. (4) and (5), the signal-to-noise ratio measured by the radar 200 is expressed by Eq. (6).

$$\frac{S_r}{J_r} = \frac{P_{pulse\_out}}{J_N} \frac{B_j}{B_r} \quad \text{Eq. (6)}$$

In other words, referring to Eq. (6), the control unit 140 controls the amplified signal generating unit 120 such that the strength $P_{pulse\_out}$ of the amplified signal 30 outputted from the amplified signal generating unit 120 becomes constant and also controls the noise signal generating unit 130 such that the strength $J_N$ of the noise signal 40 outputted from the transmission antenna 153 becomes constant.

Accordingly, the signal-to-noise ratio of the signals received by the radar 200 can become constant.

Further, the control unit 140 can control the amplified signal generating unit 120 and the noise signal generating unit 130 such that the strength of the amplified signal and that of the noise signal 40 become greater than that of the pulse signal 10 to prevent the radar 200 from tracking the echo signal 20 which is a reflected signal of the pulse signal 10 from the target. The control unit 140 controls the strength of the amplified signal 30 to be greater than that of the noise signal 40. Accordingly, the radar 200 that has received the amplified signal 30 and the noise signal 40 can recognize the amplified signal 30 as a target signal and the noise signal 40 as a noise.

For example, it is assumed that the pulse signal 10 received from the radar 200 has a central frequency of 9 [GHz], a pulse width of 500 [ns] and a frequency bandwidth of 100 [MHz] according to the analysis of the control unit 140. Hereinafter, an example of controlling the amplified signal 30 and the noise signal 40 such that the log value of the signal-to-noise ratio $(S_r/J_r)$ to be measured by the radar 200 that would receive the amplified signal 30 and the noise signal 40 radiated by the jamming signal generating apparatus 100 becomes constantly 5 [dB] will be described.

First, based on the feature that the inverse of the pulse width of the pulse signal 10 from the radar 200 is equal to the filter bandwidth of the radar 200, the control unit 140 can determine that the filter bandwidth of the radar 200 which has transmitted the pulse signal 10 satisfies a condition $B_r = 1/\text{pulse width} = 1/(200 [\text{ns}]) = 5 [\text{MHz}]$. Therefore $$\frac{B_j}{B_r} = 100 [\text{MHz}]/5 [\text{MHz}] = 20$$

and 10 log(20)=13 [dB] are obtained.

Next, the control unit 140 can control the amplification factor of the amplified signal generating unit 120 to output the amplified signal 30 having a constant strength of 20 [dBm] by amplifying the received pulse signal 10 (e.g., the strength of the received pulse signal 10 being −50 [dBm] to 0 [dBm]). Further, the control unit 140 can control the noise signal generating unit 130 to output the noise signal 40 having a strength of 28 [dBm].

Accordingly, the log value of the signal-to-noise value $(S_r/J_r)$ measured by the radar 200 is constantly 5 [dB] from the calculation $$10\log\left(\frac{S}{J}\right)[\text{dB}] =$$
$$10\log\left(\frac{P_{pulse_{out}}}{1 \text{mW}}\right)[\text{dBm}] - 10\log\left(\frac{J_N}{1 \text{mW}}\right)[\text{dBm}] + 10\log(B_j/B_r)[\text{dB}] =$$
$$20 [\text{dBm}] - 28 [\text{dBm}] + 13 [\text{dB}] = 5 [\text{dB}].$$

As a result, the radar 200 cannot track the position of the target.

The above numerical values are provided for convenience of description only. The embodiments of the present disclosure are not limited to the above numerical values.

The signal radiating unit 150 radiates the amplified signal 30 generated by the amplified signal generating unit 120 and the noise signal 40 generated by the noise signal generating unit 130. The signal radiating unit 150 may include a signal synthesizer 151, a switch 152 and a transmission antenna 153. The signal synthesizer 151 can synthesize the amplified signal 30 outputted from the amplified signal generating unit 120 and the noise signal 40 outputted from the noise signal generating unit 130. Whether to radiate the amplified signal 30 and the noise signal 40 can be determined by on/off of the switch 152. The transmission antenna 153 can radiate the amplified signal 30 and the noise signal 40 to the outside.

If the radar 200 receives the noise signal 40 earlier than the amplified signal 30, the noise signal 40 may be recognized as a main signal and, thus, the radar 200 may be switched to HOJ mode or TOJ mode. Accordingly, the control unit 140 can control the signal radiating unit 150 to radiate the amplified signal 30 earlier than the noise signal 40.

The signal receiving unit 110, the amplified signal generating unit 120, the noise signal generating unit 130, the control unit 140 and the signal radiating unit 150 of the above embodiment can be implemented by an operation device including a memory having commands programmed to perform the functions thereof and a microprocessor for executing the commands.

Figure 3:
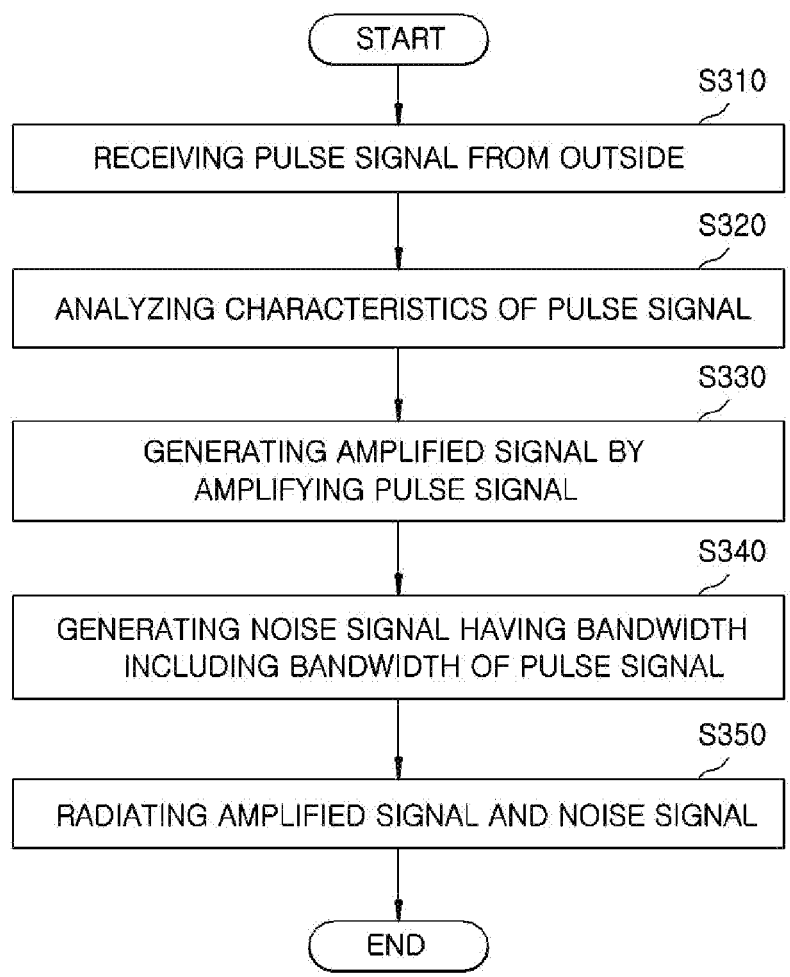
FIG. 3 is a flowchart showing a process of a jamming signal generating method in accordance with an embodiment of the present disclosure.

FIG. 3 is a flowchart showing a process of a jamming signal generating method in accordance with an embodiment of the present disclosure. The steps of the jamming signal generating method shown in FIG. 3 can be executed by the jamming signal generating apparatus 100 described with reference to FIGS. 1 and 2. Hereinafter, the respective steps will be described.

First, the signal receiving unit 110 receives the pulse signal 10 from the outside (S310). The control unit 140 analyzes the characteristics of the received pulse signal 10 and controls the signal-to-noise ratio of the amplified signal 30 and the noise signal 40 to be received by the radar 200 that has transmitted the pulse signal 10 to be constant (S320).

Then, the amplified signal generating unit 120 generates the amplified signal 30 by amplifying the pulse signal 10 (S330). The noise signal generating unit 130 generates the noise signal 40 having a bandwidth including a bandwidth of the pulse signal 10 (S340). Accordingly, the signal radiating unit 150 can radiate the amplified signal 30 and the noise signal 40 which are generated under the above-described control (S350).

The operations of the components in the respective steps have been described in detail with reference to FIGS. 1 and 2, so redundant descriptions will be omitted.

In the above embodiment, it is possible to prevent the radar 200 for tracking the target from switching to HOJ mode or TOJ mode by generating the jamming signal in which the amplified signal 30 obtained by amplifying the pulse signal 10 and the noise signal 40 are mixed.

Further, in the above embodiment, it is possible to prevent the radar 200 from tracking the position of the target 200 by making the radar 200 measure a constant signal-to-noise ratio.

The above embodiments may be implemented by various devices. For example, the embodiments of the present disclosure may be implemented by hardware, firmware, software, or a combination thereof.

In the case of implementation using hardware, the method according to the embodiment of the present disclosure may be implemented by one or more devices, such as ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors or the like. In the case of implementation using firmware or software, the method according to the embodiment of the present disclosure may be implemented in the form of modules, procedures or functions for performing the above-described functions or operations. A computer program in which a software code or the like is recorded may be stored in a computer-readable storage medium or a memory unit and executed by a processor. The memory unit may be provided inside or outside the processor to exchange data with the processor by various known units.

Combinations of blocks in the flowcharts of the present disclosure can be implemented by computer program instructions. These computer program instructions may be provided to a processor of a general purpose computer, special purpose computer, or other programmable data processing apparatus, such that the instructions, which execute via the processor of the computer or other programmable data processing apparatus, create means for implementing the functions specified in the steps of the flowchart. These computer program instructions may also be stored in a computer usable or computer readable memory that can direct a computer or other programmable data processing apparatuses to function in a particular manner, such that the instructions stored in the computer usable or computer readable medium can produce an article of manufacture including instructions that implement the function specified in the blocks of the flowcharts. The computer program instructions may also be loaded onto a computer or other programmable data processing apparatuses to cause a series of operational steps to be performed on the computer or other programmable apparatuses to produce a computer implemented process such that the instructions that execute on the computer or other programmable apparatuses provide processes for implementing the functions specified in the blocks of the flowcharts.

Each block in the flowchart may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The above description is merely an exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. An apparatus for generating a jamming signal, comprising:
   a signal receiving circuit configured to receive an external pulse signal;
   an amplitude signal generating circuit configured to generate an amplified signal by amplifying the pulse signal;
   a control circuit configured to determine a bandwidth of the pulse signal;
   a noise signal generating circuit configured to generate a noise signal having a bandwidth corresponding to the determined bandwidth of the pulse signal; and
   a signal radiating circuit configured to radiate the amplified signal and the noise signal,
   wherein the control circuit is further configured to control the amplified signal generating circuit and the noise signal generating circuit such that a signal-to-noise ratio of the amplified signal and the noise signal to be received by another apparatus that has transmitted the pulse signal becomes constant based on characteristics of the pulse signal.

2. The apparatus of claim 1, wherein the control circuit is further configured to control the amplified signal generating circuit such that a strength of the amplified signal is constant.

3. The apparatus of claim 1, wherein the control circuit is configured to control the noise signal generating circuit such that a strength of the noise signal is constant.

4. The apparatus of claim 3, wherein the control circuit is configured to control the noise signal generating circuit such that the strength of the noise signal becomes greater than a strength of the received pulse signal.

5. The apparatus of claim 1, wherein the control circuit is configured to control the amplified signal generating circuit and the noise signal generating circuit such that a strength of the amplified signal and a strength of the noise signal become greater than a strength of the received pulse signal, and the strength of the amplified signal becomes greater than the strength of the noise signal.

6. The apparatus of claim 1, wherein the control circuit is configured to control the signal radiating circuit such that the amplified signal is radiated earlier than the noise signal.

7. The apparatus of claim 1, wherein the noise signal generated by the noise signal generating circuit has a bandwidth restricted in a predetermined range.

8. The apparatus of claim 1, wherein the noise signal generated by the noise signal generating circuit has a bandwidth equal to that of the pulse signal.

9. A method for generating a jamming signal, comprising:
   receiving an external pulse signal;
   generating an amplified signal by amplifying the pulse signal;
   determine a bandwidth of the pulse signal;
   generating a noise signal having a bandwidth a corresponding to the determined bandwidth of the pulse signal; and
   radiating the amplified signal and the noise signal based on the bandwidth of the pulse signal,
   wherein the amplified signal and the noise signal are generated such that a signal-to-noise ratio of the amplified signal and the noise signal to be received by another apparatus that has transmitted the pulse signal become constant based on characteristics of the pulse signal.

10. The method of claim 9, wherein said generating the amplified signal includes controlling a strength of the amplified signal to be constant.

11. The method of claim 9, wherein said generating the noise signal includes controlling a strength of the noise signal to be constant.

12. The method of claim 11, wherein said generating the noise signal includes controlling the strength of the noise signal to be greater than a strength of the received pulse signal.

13. The method of claim 9, further comprising:
controlling the strength of the amplified signal and the strength of the noise signal to be greater than the strength of the received pulse signal and controlling the strength of the amplified signal to be greater than the strength of the noise signal.

14. The method of claim 9, wherein the amplified signal is radiated earlier than the noise signal.

15. The method of claim 9, wherein the generated noise signal has a bandwidth restricted in a predetermined range.

16. The method of claim 9, wherein the generated noise signal has a bandwidth equal to that of the pulse signal.

* * * * *